(12) United States Patent
D'Aquino et al.

(10) Patent No.: US 7,089,146 B1
(45) Date of Patent: Aug. 8, 2006

(54) APPARATUS AND METHOD FOR SUB-RANGING CONVERSION FOR TEMPERATURE SENSING

(75) Inventors: Dan D'Aquino, Sunnyvale, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 9 days.

(21) Appl. No.: 10/951,852

(22) Filed: Sep. 28, 2004

(51) Int. Cl.
*H03M 1/06* (2006.01)

(52) U.S. Cl. ............... 702/132; 341/118; 341/119; 341/120; 341/136; 374/178; 374/183; 257/467; 438/237

(58) Field of Classification Search ............... 702/132; 341/118–120, 136; 374/178, 183; 257/467, 257/470

See application file for complete search history.

(56) References Cited

U.S. PATENT DOCUMENTS 6,149,299 A 11/2000 Aslan et al.

6,480,127 B1 11/2002 Aslan

OTHER PUBLICATIONS

National Semiconductor Corporation, "± 0.75° C. Accurate, Remote Diode and Local Digital Temperature Sensor with Two-Wire Interface", LM86, Apr. 2003, pp. 1-21.

*Primary Examiner*—John Barlow
*Assistant Examiner*—Hien Vo
(74) *Attorney, Agent, or Firm*—Darby & Darby PC; Matthew M. Gaffney (57) ABSTRACT

A circuit for temperature sensing receives a differential voltage that corresponds to the voltage across a forward-biased PN junction. The circuit for temperature sensing provides a first current to the PN junction, and subsequently provides a second current. Also, the temperature of the PN junction is determined based on the difference between the differential voltage when the first current is applied and the differential voltage when the second current is applied. Further, the circuit for temperature sensing self-biases half of the differential signal. The other half of the differential signal is level-shifted by an amount that is fixed and pre-determined based on the self-biasing to provide a sub-ranging voltage. A sub-ranging analog-to-digital conversion is performed on the differential voltage in which the sub-ranging voltage is subtracted from the differential voltage during the conversion.

21 Claims, 5 Drawing Sheets

APPARATUS AND METHOD FOR SUB-RANGING CONVERSION FOR TEMPERATURE SENSING

FIELD OF THE INVENTION

The invention is related to temperature sensing, and in particular, but not exclusively, to an apparatus and method for a self-biasing analog front end for a temperature sensor.

BACKGROUND OF THE INVENTION

Temperature measurements can be made by applying a current to a forward-biased PN junction and measuring the resulting potential across the PN junction. Further, temperature calculations can be made by determining the voltage difference that results as a function of different applied currents across a PN junction, using differing areas of PN junctions to which a current is applied, or a combination of both.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a circuit for temperature sensing. The circuit for temperature sensing receives a differential voltage that corresponds to the voltage across a forward-biased PN junction. Also, the circuit for temperature sensing provides a first current to the PN junction, and subsequently provides a second current. The temperature of the PN junction is determined based on the difference between the differential voltage when the first current is applied and the differential voltage when the second current is applied. Further, the circuit for temperature sensing self-biases half of the differential signal. The other half of the differential signal is level-shifted by an amount that is fixed and predetermined based on the self-biasing to provide a sub-ranging voltage. A sub-ranging analog-to-digital conversion is performed on the differential voltage in which the sub-ranging voltage is subtracted from the differential voltage during the conversion.

Figure 1:
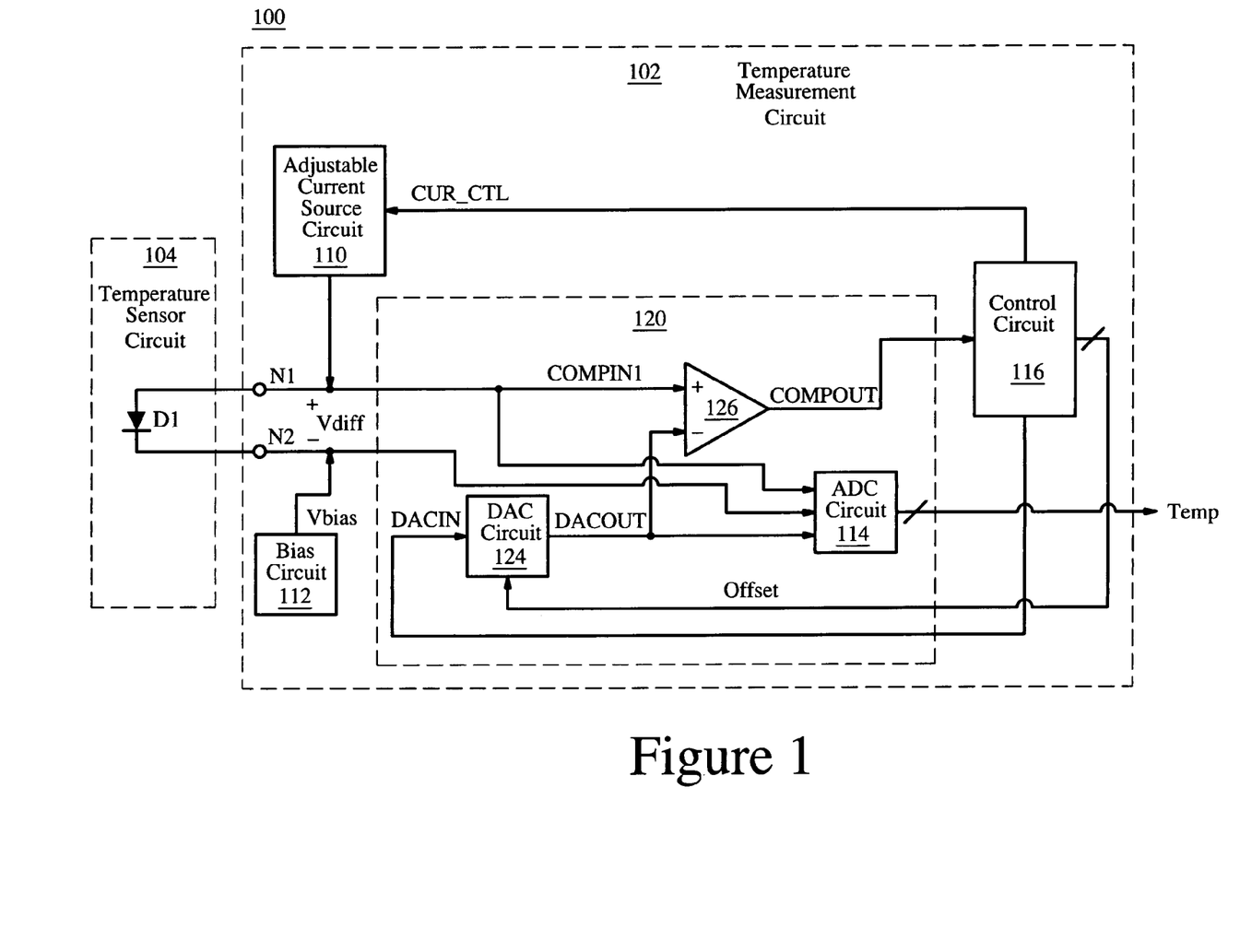
FIG. 1 shows a block diagram of an embodiment of a temperature sensing system.

FIG. 1 shows a block diagram of an embodiment of a temperature measurement system 100. Temperature measurement system 100 includes temperature measurement circuit 102 and temperature sensor circuit 104. Temperature sensor circuit 104 may be located on the same substrate, or a different substrate, as the substrate containing temperature measurement circuit 102. Temperature sensor circuit 104 includes a PN junction, represented as diode D1. In one embodiment, the PN junction is provided from the base-emitter junction of a bipolar junction transistor. Temperature measurement circuit 102 includes adjustable current source circuit 110, bias circuit 112, converter circuit 120, control circuit 116. Converter circuit 120 includes analog-to-digital converter (ADC) circuit 114, digital-to-analog converter (DAC) circuit 124, and comparator circuit 126.

Diode D1 is configured to provide voltage Vdiff in response to a bias current. Adjustable current source 110 is arranged to provide the bias current. Voltage Vdiff is dependent upon the temperature of diode D1 and the applied bias current.

Further, bias circuit 112 is arranged to provide bias voltage Vbias at node N2. In one embodiment, as described in greater detail below with regard to FIG. 2, bias circuit 112 may be included in DAC circuit 124 (and converter circuit 120). In one embodiment, voltage Vbias is provided at approximately 320 mV. Converter circuit 120 is arranged to provide signal Temp based, in part, on signal Vdiff. Signal Temp indicates the temperature of temperature sensor circuit 104.

DAC circuit 124 is arranged to provide signal DACOUT from signal DACIN as described in further detail below. Also, comparator circuit 126 is arranged to compare signal DACOUT with signal COMPIN1, and to provide signal COMPOUT based on the comparison. As explained in greater detail below, control circuit 116 is arranged to receive signal COMPOUT, and to provide signals Offset, DACIN, and CUR_CTL.

ADC circuit 114 is arranged to perform a sub-ranging analog-to-digital conversion on signal Vdiff. Further, ADC 114 circuit may be implemented by any type of converter (e.g. flash, successive approximation, sigma-delta, and the like) that is capable of performing an analog-to-to digital conversion within a required time interval. ADC 114 circuit is utilized to capture differential voltage Vdiff from diode D1 such that the temperature of diode D1 may be calculated. ADC 114 is further arranged to perform sub-ranging based on signal DACOUT. In one embodiment, DAC circuit 124 is arranged to provide signal DACOUT such that signal DACOUT is substantially equal to the voltage at node N1 minus an offset voltage component Voffs. Offset voltage component Voffs is based on voltage Vbias. In one embodiment, ADC 114 provides signal Temp. In another embodiment, ADC circuit 114 provides signal ADCOUT (not shown) based on the analog-to-digital conversion of signal DACOUT, and further digital circuitry (not shown) in converter circuit 120 is configured to calculate signal Temp based on signal ADCOUT.

DAC circuit 124 is arranged to provide signal DACOUT from signal DACIN by performing a digital-to-analog conversion. Also, DAC circuit 124 is arranged to provide signal DACOUT with offset voltage component Voffs if signal Offset is asserted. In one embodiment, the offset voltage component is substantially equal to Vbias plus a pre-determined voltage. In one embodiment, the pre-determined voltage corresponds to 1 least significant bit (LSB) of DAC circuit 124, and 1 least significant bit corresponds about 30–50 mV. Other embodiments may employ a different pre-determined voltage, as explained in greater detail below.

As previously described, adjustable current source circuit 110 is arranged to apply the bias current at node N1. Further, adjustable current source circuit 110 is arranged such the value of the current applied at node N1 is dependent on signal CUR_CTL. Control circuit 116 is arranged to provide signal CUR_CTL to direct adjustable current source circuit 110 to apply two currents to diode D1 such that diode D1 provides differential voltage Vdiff at two different values. In one embodiment, the larger of the two currents is sixteen times as great as the smaller current.

In one embodiment, when initially providing the first current, control circuit 116 asserts signal Offset. Accordingly, signal DACOUT is provided with a voltage offset component that is substantially equal to Vbias plus the pre-determined voltage, where voltage Vbias is substantially equal to the voltage at node N2. Next, control circuit 116 adjusts signal DACIN until signal DACOUT is substantially equally to COMPIN1. The adjustment of signal DACIN is based, in part, on signal COMPOUT, and may be performed according to a successive approximation algorithm, a search algorithm, up-down counting, and the like. Next, signal DACIN is maintained at substantially the same value, and signal Offset is de-asserted. Accordingly, at this point, signal DACOUT is substantially equal to (the voltage at node N1 minus the voltage at node N2), further minus the pre-determined voltage. Comparator circuit 126 may be disabled or simply ignored by control circuit 216 at this point.

It is expected that diode D1 will respond to a smaller current with a differential voltage Vdiff that is up to 100 mV less than Vdiff in response to a larger current. In one example, a 5-bit DAC is used to resolve voltages within a range of 1.2 volts to a resolution of 37.5 mV (i.e., the value of the LSB of DAC circuit 124, or "quantization level"). The digital code that produces a voltage that is one LSB less than the response voltage for the larger current will correspond to a voltage that is within 37.5 mV of the response voltage. On average, the greatest digital code is expected to be within 37.5 mV of the present voltage response (0–1 LSB). Accordingly, the offset voltage of this example will be within 6.25 mV of the center of the expected differential voltage responses of diode D1 to the applied larger and smaller currents.

Temperature measurements of diode D1 are measured by applying currents, measuring resulting voltages, and calculating a temperature based on the resulting voltages. In one embodiment, adjustable current source circuit 110 is configured to provide two currents to the PN junction. The currents are applied so that the PN junction in diode D1 is forward-biased. The resulting voltages across the PN junction from each applied current is sampled with ADC circuit 114.

In an alternate embodiment, the voltage across the PN junction in diode D1 may be over-sampled such that many samples are taken for a selected bias current. The samples may be averaged to reduce the effects of noise and to enhance the accuracy of calculations using values derived by the analog-to-digital conversions. Samples are typically made at regular intervals such that each sample is separated from other samples by substantially equal time differences.

Also, converter circuit 120 is arranged to provide signal Temp based on voltage Vdiff when the first current is applied, and based on signal voltage Vdiff when the second current is applied. Temperature calculations can be determined according to the following formula:

$T = q * \Delta VBE / (\eta * k * \ln(M))$, where:

T=absolute temperature in Kelvin;

q=the charge of an electron;

ΔVBE=change in Vdiff;

k=Boltzmann's constant;

M=ratio of the two applied currents; and

η=non-ideality factor of the diode.

The ratio (M) can be realized as a combination of area ratios of the PN junctions using a common current, a ratio of currents across two PN junctions that have the same area, or a combination thereof. In the case where the PN junctions have the same area, the change in Vdiff can be determined by subtracting the measured voltages that resulted by applying two different currents. The two PN junctions ideally should have the same PN junction temperature despite the fact that they cannot exist in the exact same physical location.

Similarly, a value for the ratio M can be achieved when only using one PN junction. (The one PN junction may include "stacked diodes" or PN junctions in parallel.) To achieve a value for the ratio M when using only one PN junction, two different currents can be successively applied to the one PN junction. Keeping the time between applications of the successive currents relatively small can reduce the magnitude of errors due to temperature drift of the one PN junction.

Control circuit 116 may be implemented as a microprocessor, a microcontroller, hardwired logic, a state machine, and the like. Mathematic functions provided by control circuit 116 and/or conversion circuit 120 may be implemented as algorithms embodied in software or firmware, implemented using physical devices, or implemented as a combination of both. For example, a function for averaging may be implemented as an average calculator. An average calculator may use an adder to find the sum of input digits and then use a divider to divide the sum by the number of input digits.

In one embodiment, temperature measurement system 100 is arranged to measure the temperature of one PN junction, such as diode D1. In other embodiments, temperature measurement system 100 is arranged to measure the temperature of more than one PN junction. Each PN junction may be either internal or external. The multiple PN junctions may be switched in such that the temperature of each PN junction is measured in turn.

As discussed above, in one embodiment, voltage offset components Voffs is substantially Vbias+a predetermined voltage (e.g. corresponding to 1lsb), where 1lsb is about 40 mV (e.g. 37.5 mV). In another embodiment, DAC 124 has a much greater resolution than 37.5 mV, and Voffs is Vbias+X lsb, where X is the number of bits that corresponds to the pre-determined voltage (about 40 mV, in one embodiment). In other embodiments, M may be a number other than 16, and accordingly, a pre-determined voltage other than 40 mV may be employed for voltage offset component Voffs. Preferably, the pre-determined voltage corresponds to half of the expected ΔVBE for the value of M employed for substantially optimal sub-ranging. In one embodiment, M is 16, and the expected value of ΔVBE is about 80 mV. Accordingly, a pre-determined voltage about of 40 mV is employed. For a different value of M, a different pre-determined voltage may be employed for offset voltage component Voffs.

In another embodiment, the pre-determined voltage is substantially zero, so that Voffs is substantially equal to voltage Vbias. In this embodiment, after signal Offset is de-asserted, control circuit 116 may subtract one or more bits from signal DACIN. Preferably, the number of bits subtracted corresponds to half of the expected ΔVBE for the value of M employed for substantially optimal sub-ranging.

Figure 2:
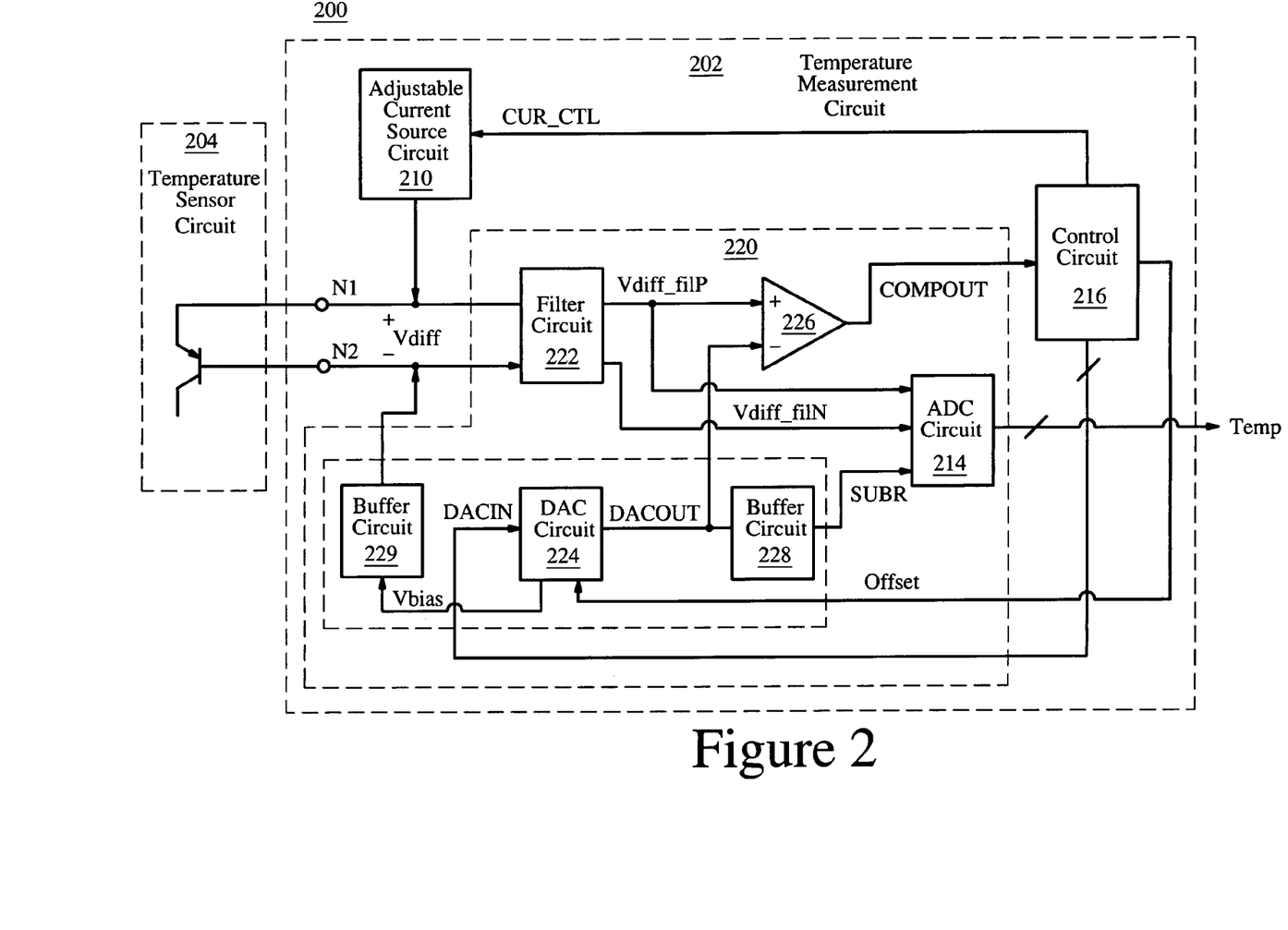
FIG. 2 illustrates a block diagram of another embodiment of a temperature sensing system, in which a digital-to-analog converter (DAC) circuit is employed to provide a bias voltage.

FIG. 2 illustrates a block diagram of temperature sensing system 200. Components in temperature sensing system 200 may operate in a similar manner as similarly-named components in temperature sensing system 100, and may operate in a different manner in some ways. As illustrated in FIG. 2, the PN junction in temperature sensor circuit 204 may be provided from the base-emitter junction of a bipolar junction transistor. Converter circuit 220 further includes buffer circuits 228–229 and filter circuit 222.

Filter circuit 222 is arranged provide filtered differential signal Vdiff_fil from differential signal Vdiff. Differential signal Vdiff_fil includes signals Vdiff_filP and Vdiff_filM. Comparator circuit 226 is arranged to compare signal DACOUT with signal Vdiff_filP. In one embodiment, filter circuit 222 is a large time constant low-pass filter. Filter circuit 222 may be utilized to smooth out transient spikes for ensuring an accurate comparison by comparator circuit 226. In this embodiment, in part because a large time constant low-pass filter is utilized, a sample-and-hold device is not needed at the input of comparator circuit 226, even if system noise is relatively high.

Buffer circuit 229 is arranged to provide the voltage at node N2 from voltage Vbias such that the voltage at node N2 is substantially the same as Vbias. Similarly, buffer circuit 228 is arranged to provide sub-ranging signal SUBR from signal DACOUT, such that the voltage of signal SUBR is substantially the same of the voltage of signal DACOUT. DAC circuit 224, buffer circuit 228, and buffer circuit 229 may be implemented together as a single DAC circuit rather than as separate circuit elements. In another embodiment, buffer circuits 228 and 229 are not included in converter circuit 220.

Figure 3:
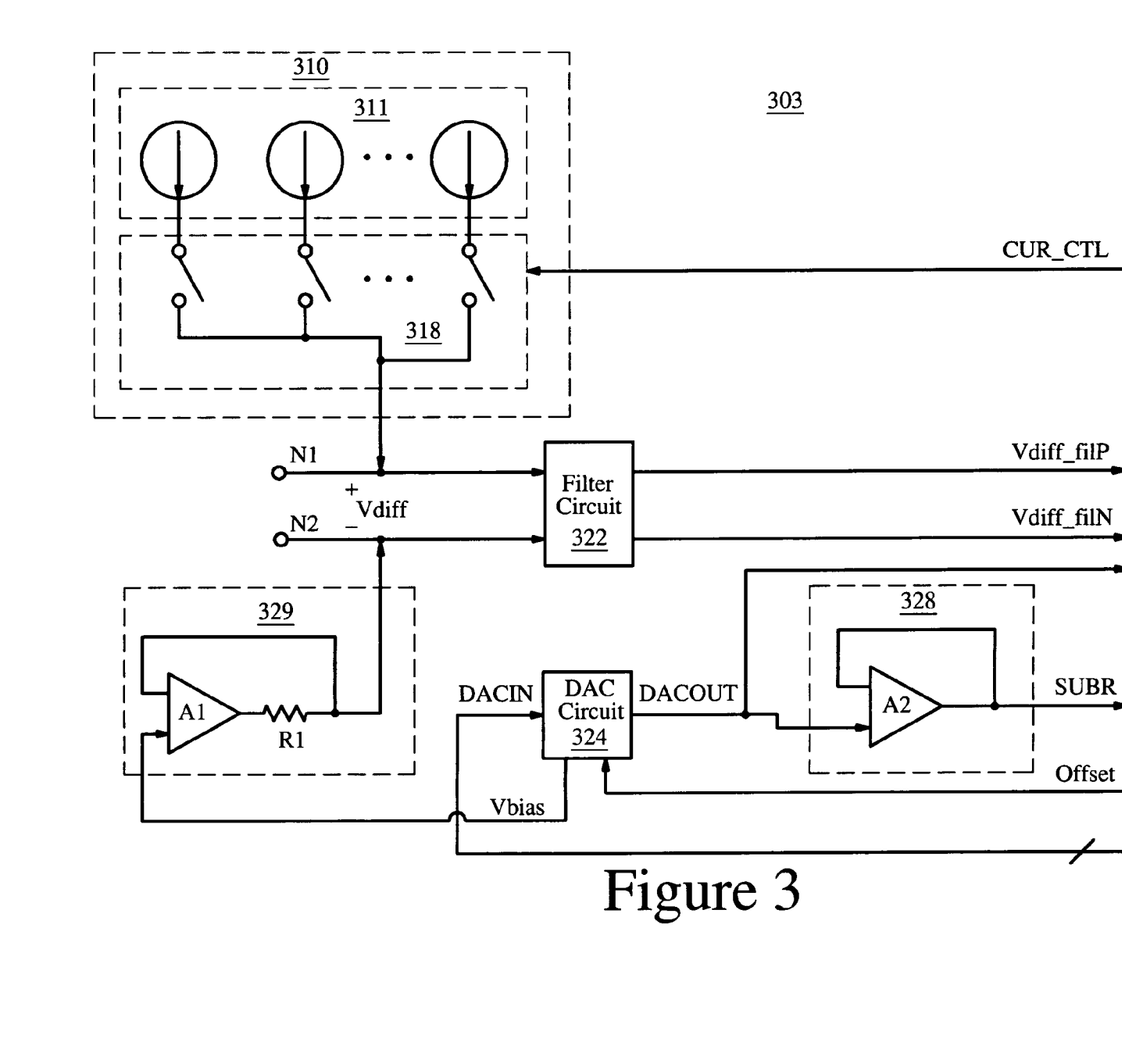
FIG. 3 shows a block diagram of an embodiment of a portion of the temperature measurement circuit of FIG. 2.

FIG. 3 shows a block diagram of an embodiment of a portion 303 of temperature measurement circuit 202. Components in portion 303 may operate in a similar manner to similarly-named components in temperature measurement circuit 202, and may operate in a different manner in some ways. Buffer circuit 329 includes operational amplifier A1 and optional resistor R1. Buffer circuit 328 includes amplifier A2. Adjustable current source circuit 310 includes current sources 311 and switch array 318.

Switch array 318 is coupled between the outputs of current sources 311 and node N1. Switch array 318 is arranged to provide at least two levels of current by selectively coupling one or more current sources among current sources 311 to node N1. In one embodiment, there are 16 current sources in current sources 311, and a current density ratio of 16-to-1 is provided by selectively switching on one or all of the 16 current sources when current sources 311 each have equal current densities. Also, individual current sources may be activated at different times such that a desired programmable current level may be realized by selectively activating different current sources. For example, each current source can be activated sequentially for temperature measurements such that the same current density is provided from differing current sources. The current sources may be sized differently such that integer and noninteger current ratios of greater than one can be achieved.

Figure 4:
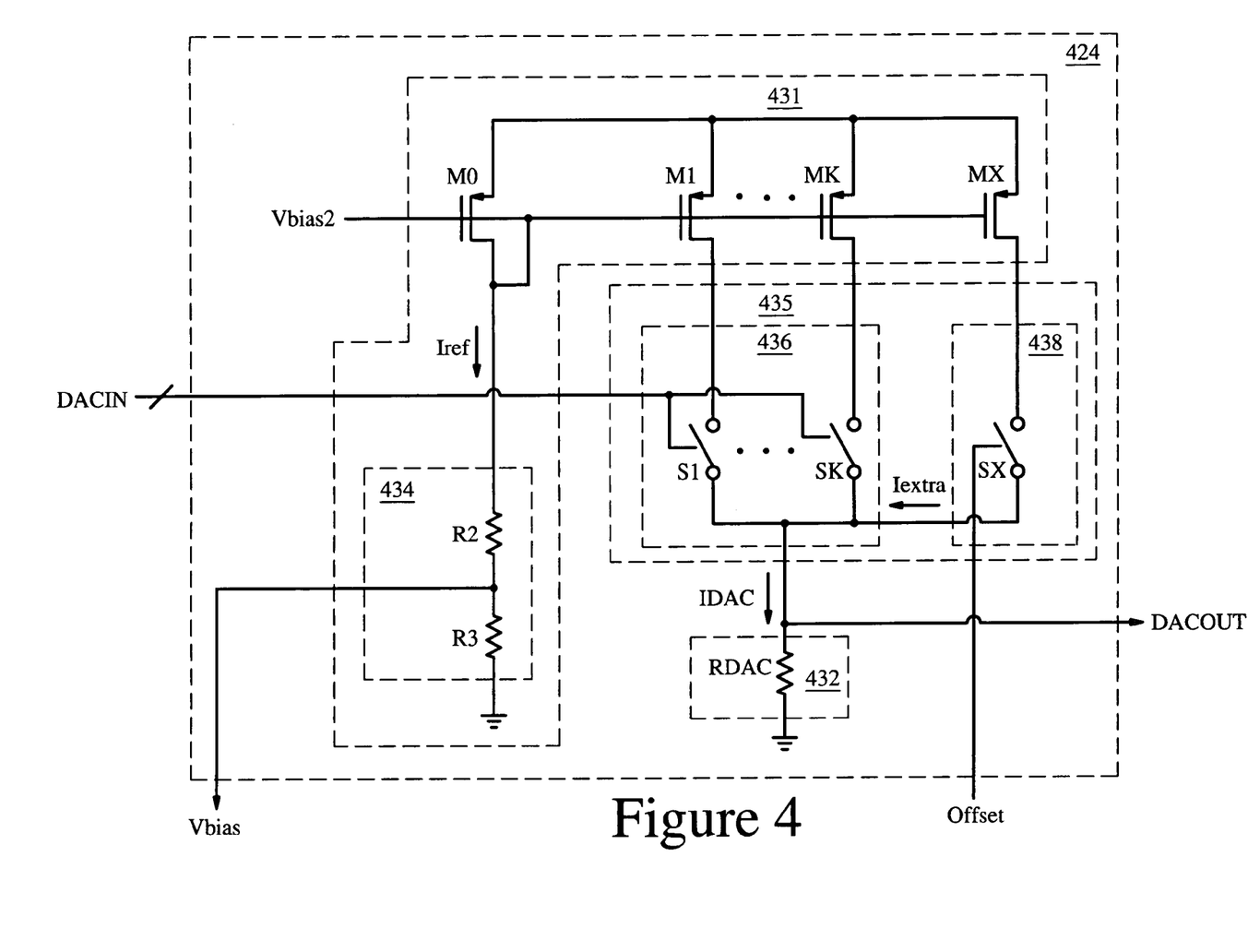
FIG. 4 schematically illustrates an embodiment of the DAC circuit of FIG. 3.

FIG. 4 schematically illustrates an embodiment of DAC circuit 424. DAC circuit 424 may operate in a substantially similar manner to DAC circuit 324 of FIG. 3, and may operate in a different manner in some ways.

DAC circuit 424 includes resistor circuit 432, current mirror 431, and switch circuit array 435. Current mirror 431 includes transistors including M0, M1–MK, and MX; and voltage divider 434. Resistor circuit 432 includes resistor RDAC. Voltage divider 434 includes resistors R2 and R3. Further, switch circuit array 435 includes portion 436 and portion 438. Portion 436 includes switch circuits S1–SK. Portion 438 includes switch circuit SX.

Each of the components illustrated in FIG. 4, except for resistor circuit 432, are configured to operate together as a current DAC. The current DAC is arranged to convert signal DACIN into current IDAC such that current IDAC includes an offset voltage component that is substantially equal to Vbias if signal Offset is asserted. Also, resistor circuit 432 is arranged to convert current IDAC into signal DACOUT.

Voltage Vbias2 is provided at the gate of each of the transistors in current mirror 431. Voltage divider 434 is arranged to provide voltage Vbias from voltage Vbias2, and further arranged to provide reference current Iref. Additionally, transistor M0 and voltage divider 434 operate as a reference branch of current mirror 431. Each transistor in current mirror 431, other than transistor M0, is coupled to a corresponding switch circuit of switch circuit array 435. For each transistor in current mirror 431 other than transistor M0, if the corresponding switch circuit is turned on, the transistor is arranged to provide a drain current based on Iref and a ratio between the transistor and transistor M0.

Switch circuits S1–SK are controlled by signal DACIN. Switch circuits in portion 438 are controlled by signal Offset. In one embodiment, current IDAC is proportional to the value of DACIN when signal Offset is not asserted. When signal Offset is asserted, portion 438 provides current Iextra such that Iextra*RDAC is substantially equal to Voffs. When signal Offset is not asserted, switch circuits in portion 438 are off. Accordingly, when signal Offset is asserted, signal DACOUT is increased by voltage offset component Voffs. As mentioned previously, in one embodiment, offset voltage component Voffs is substantially equal to Vbias+1 LSB of DAC 424.

In one embodiment, resistors R2, R3, and RDAC are matched to each other. This way, changes in signal Vbias are tracked by changes in signal DACOUT.

Figure 5:
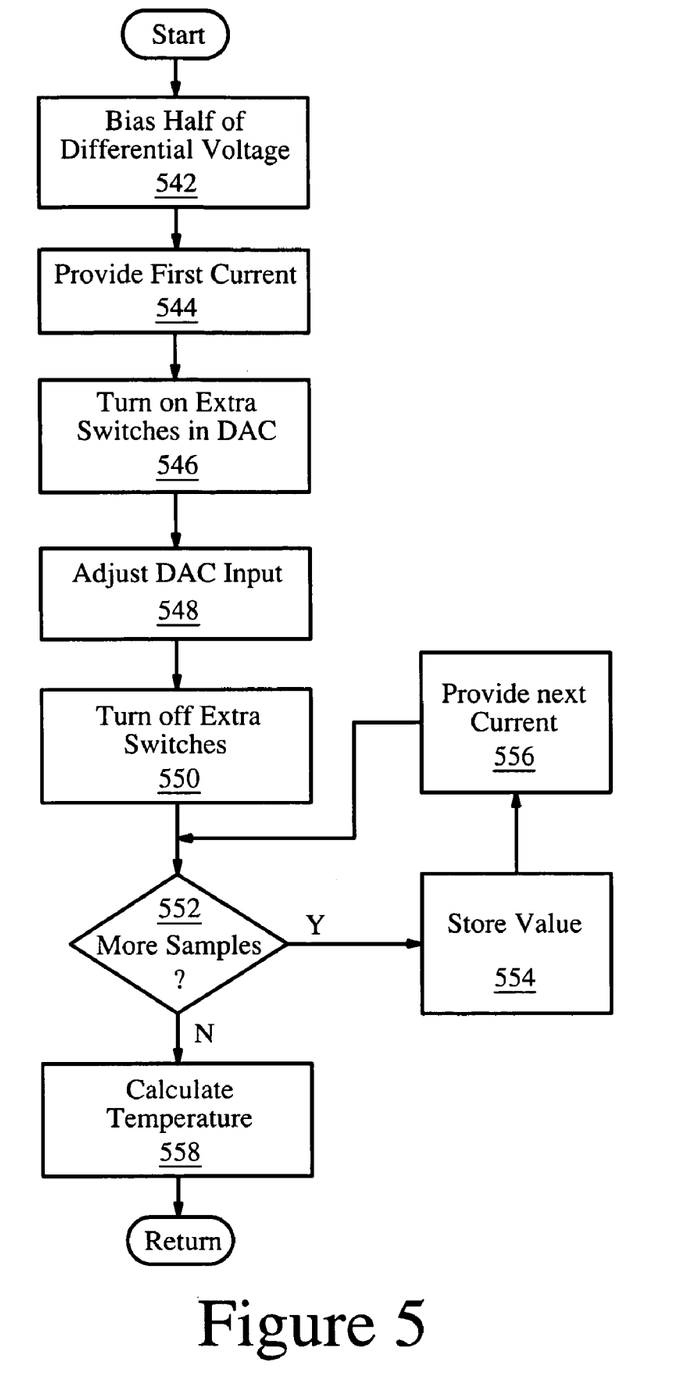
FIG. 5 shows a flow chart of an embodiment of a process for measuring a temperature, in accordance with aspects of the invention.

FIG. 5 shows a flow chart of an embodiment of process 500. Process 500 is a process for measuring a temperature that may be employed by embodiments of circuits previously described.

After a start block, the process proceeds to block 542, where half of a differential voltage (e.g. differential voltage Vdiff) is biased. For example, in FIG. 3, node N2 is biased by DAC circuit 324 and buffer circuit 329. The process then moves to block 544, where a first current is provided. In one embodiment, control circuit 216 of FIG. 2 provides signal CUR_CTL to adjustable current source 210 such that adjustable current source 210 provides the first current at node N1.

The process then advances to block 546, where extra switches are turned on in a digital-to-analog converter circuit. In one embodiment, control circuit 216 of FIG. 2 provides signal Offset to switch circuits in portion 438 of FIG. 4 such that each of the switch circuits in portion 438 is turned on. The process then proceeds to block 548, where the DAC input (e.g. signal DACIN) is adjusted. In one embodiment, control circuit 216 of FIG. 2 adjusts signal DACIN based on signal COMPOUT until signal DACOUT is substantially equal to signal COMPIN1. Blocks 546 and 548 may be regarded as occurring during a first phase, and block 550 may be regarded as occurring during a second phase.

The process then moves to block 550, where the extra switches are turned off. In one embodiment, control circuit 216 of FIG. 2 adjusts signal Offset such that each of the switch circuits in portion 438 of FIG. 4 are turned off. In one embodiment, signal DACIN remains substantially the same. In another embodiment, one LSB is subtracted from signal DACIN. The process then advances to decision block 552, where a determination is made as to whether more samples of voltage Vdiff are needed. If so, the process proceeds to block 554, where a value is stored. In one embodiment, ADC circuit 214 of FIG. 2 converts signal Vdiff after the extra switches have been turned off. Conversion circuit 220 may store each converted value of signal Vdiff, or may perform calculations and store the calculated value.

The process then proceeds to block 556, where the next current is provided. In one embodiment, control circuit 216 of FIG. 2 adjusts signal CUR_CTL such adjustable current source 210 provides the next current at node N1. The extra switches remain off, and signal DACIN is maintained at substantially the same value. The process then proceeds to decision block 552.

At decision block 552, if no more samples are needed, the process proceeds to block 558, where the temperature is calculated. The temperature may be calculated by converter circuit 220 of FIG. 2 based on the last converted value of signal Vdiff, and the value(s) previously stored at block 554. In one embodiment, the temperature may be calculated based on the equation $T=q*\Delta VBE/(\eta*K*\ln(M))$, as previously described.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for temperature sensing, comprising:
a comparator circuit that is configured to compare a first comparison voltage with a second comparison voltage to provide a comparison output signal, wherein the first comparison voltage is based on a first half of a differential signal; the second half of the differential signal is based on a bias voltage; and wherein the second comparison voltage is based, in part, on a DAC output voltage; and
a digital-to-analog converter circuit that is arranged to provide the DAC output voltage from a DAC input signal, wherein the DAC input signal is based, in part, on the comparison output signal, the digital-to-analog converter is configured to offset the DAC output voltage during a first phase such that a difference between the DAC output voltage during the first phase and the DAC output voltage during a second phase is substantially equal to an offset voltage, and wherein the offset voltage is based on the bias voltage.

2. The circuit of claim 1, wherein the digital-to-analog converter circuit is further arranged to provide the bias voltage such that the bias voltage substantially tracks the offset voltage.

3. The circuit of claim 1, further comprising a buffer that is arranged to provide the second half of the differential signal from the bias voltage.

4. The circuit of claim 1, further comprising a control circuit that is arranged to provide the DAC input signal based, in part, on the comparator output signal.

5. The circuit of claim 4, further comprising:
an analog-to-digital converter circuit that is arranged to provide an ADC output signal based on the differential signal, and further based on sub-ranging according to the DAC output signal; and
an adjustable current source circuit that is arranged to provide a current to a first node, and further arranged such that the amount of current is adjustable based on a current control signal, wherein the first half of the differential signal is provided at the first node during operation, and wherein the control circuit is further arranged to, based on a temperature sensing algorithm:
provide the current control signal; and
based, at least in part, on the ADC output signal, provide a digital signal that indicates a temperate.

6. The circuit of claim 1, wherein the digital-to-analog converter circuit includes:
a current digital-to-analog converter that is arranged to provide an analog current from the DAC input signal, wherein the current digital-to-analog converter circuit includes:
a current mirror that includes a reference branch and a plurality of current branches; and
a plurality of switch circuits, wherein each of the plurality of switch circuits is coupled to a corresponding one of the plurality of current branches, switches circuits in a portion of the plurality of switch circuits are arranged to open and close based on the DAC input voltage, and wherein each switch circuit in another portion of the plurality of switch circuits is arranged to be closed during the first phase, and to be open during the second phase; and
a resistor circuit that is arranged to provide the DAC output voltage from the analog current.

7. The circuit of claim 6, wherein the reference branch includes a voltage divider including at least two resistors, wherein the voltage divider is arranged to provide the bias voltage, and wherein at least one resistor in the resistor circuit is matched to at least one resistor in the voltage divider such that the bias voltage substantially tracks the offset voltage.

8. A circuit for temperature sensing, comprising:
a current source circuit that is arranged to provide an adjustable current to a first node such that the adjustable current is based on a current control signal, wherein a first half of a differential voltage is provided at the first node during operation;

a control circuit that is arranged to provide the current control signal; and a converter circuit that is arranged to, based in part on the differential voltage, provide a digital output signal that indicates a temperature, wherein the converter circuit includes:

a digital-to-analog converter circuit that is arranged to provide a DAC output voltage from a DAC input signal such that the DAC output signal includes an offset voltage if an offset signal is asserted, wherein the offset voltage is approximately equal to a second half of the differential voltage plus a pre-determined voltage;

a comparator circuit that is configured to compare a first comparison voltage with a second comparison voltage to provide a comparison output signal, wherein the first comparison voltage is based on the first half of the differential voltage; and wherein the second comparison voltage is based on the DAC output voltage;

an analog-to-digital converter circuit that is arranged to provide an ADC output signal based on the differential input signal, and further based on sub-ranging according to the DAC output signal, wherein the digital output signal is based, at least in part, on the ADC output signal.

9. The circuit of claim 8, wherein the digital-to-analog converter circuit is further configured to provide a second half of the differential voltage such that the second half of the differential voltage substantially tracks the offset voltage.

10. The circuit of claim 8, wherein the pre-determined voltage is about 40 mV.

11. The circuit of claim 8, wherein the control circuit is further configured to:

provide the current control signal;
during a first phase:
assert the offset signal; and
adjust the DAC input signal based on the comparator output signal such that the first comparison voltage is substantially equal to the second comparison voltage; and
during a second phase:
de-assert the offset signal; and
maintain the DAC input signal at substantially the same value as at an end of the first phase.

12. The circuit of claim 8, wherein the control circuit is further configured to:

provide the current control circuit such that the adjustable current corresponds to a first current;
while the adjustable current corresponds to the first current:
assert the offset signal;
adjust the DAC input signal based on the comparator output signal such that the first comparison voltage is substantially equal to the second comparison voltage;
de-assert the offset signal while maintaining the DAC input signal at substantially the same value; and
provide the current control circuit such that the adjustable current corresponds to a second current while leaving the offset signal de-asserted and maintaining the DAC input signal at substantially the same value,
wherein the conversion circuit is configured to store a first value that is based on the DAC input signal after de-asserting the offset signal while the adjustable current corresponds to the first current, and further arranged to provide the digital output signal based, in part, on the first value and a second value that is based on the DAC input signal while the adjustable current corresponds to the second current.

13. The circuit of claim 12, wherein the pre-determined voltage is roughly equal to half of: an expected value of the differential voltage when the first current is applied minus the differential voltage when the second current is applied.

14. A method for temperature sensing, comprising:

providing a bias voltage to a cathode of a P-N junction;
providing a sub-ranging voltage based on an anode voltage of the P-N junction such that the sub-ranging voltage is level-shifted by an amount of voltage that is based on the bias voltage;
providing a digital signal based on the anode voltage minus the bias voltage, and further minus the sub-ranging voltage; and
determining a temperature of the P-N junction based, in part, on the determined value.

15. The method of claim 14, wherein determining the temperature of the P-N junction includes:

providing a first current to the P-N junction;
providing a second current to the P-N junction;
based, in part, on the digital signal, calculating the temperature substantially according to the equation $T=q*\Delta VBE/(\eta*k*\ln(M))$, where T represents absolute temperature, q represents the charge of an electron, $\Delta VBE$ represents a voltage of the P-N junction when the second current is applied minus a voltage of the P-N junction when the first current is applied, $\eta$ represents a non-ideality factory of the P-N junction, k represents Boltzmann's constant, and M represents a ratio of the second current to the first current.

16. The method of claim 14, wherein providing the sub-ranging voltage includes:

providing the sub-ranging voltage such that the sub-ranging voltage includes an offset voltage component that is substantially equal to the bias voltage plus a pre-determined voltage;
adjusting the sub-ranging voltage such that the sub-ranging voltage is approximately equal to the anode voltage; and
removing the offset voltage component from the sub-ranging voltage.

17. The method of claim 16, wherein providing the sub-ranging voltage such that the sub-ranging voltage includes an offset voltage component includes turning on each switch circuit in a portion of a plurality of switch circuits.

18. The method of claim 17, wherein removing the offset voltage component includes turning off each switch circuit in the portion of the plurality of switch circuits.

19. The method of claim 17, wherein adjusting the sub-ranging voltage includes:

comparing the sub-ranging voltage with the anode voltage; and
based, in part, on the comparison, controlling switch circuits in another portion of a plurality of switch circuits such that the sub-ranging voltage is approximately equal to the anode voltage.

20. The method of claim 19, wherein:

controlling the switch circuits in the other portion of the plurality of switch circuits includes:
providing a DAC input signal based on the comparison by employing at least one of a successive approximation algorithm, up-down counting, and a search algorithm to provide a DAC input voltage; and employing the DAC input signal to control the switch circuits in the other portion of the plurality of switch circuits.

21. The method of claim 19, further comprising employing a current digital-to-analog converter and a resistor circuit to provide the sub-ranging voltage, wherein the plurality of switch circuits are included in the current digital-to-analog converter, the current digital-to-analog converter further includes a current mirror that includes a reference branch and a plurality of current braches, each switch circuit in the other portion of the plurality of switch circuits is coupled to a corresponding one of the plurality of current branches, providing the bias voltage is accomplished by employing a voltage divider in the reference branch, and wherein at least one resistor in the voltage divider is matched to at least one resistor in the resistor circuit such that the bias voltage tracks the offset voltage.

* * * * *